United States Patent
Hiyama et al.

[11] Patent Number: 5,836,775
[45] Date of Patent: *Nov. 17, 1998

[54] CONNECTOR APPARATUS

[75] Inventors: Naoki Hiyama; Kenji Suzuki, both of Kanagawa, Japan; Vincent D. Dimondi, Cary, N.C.; Nobuei Takai, Tokyo, Japan; Nai Hock Lwee, Singapore, Japan; Hiroshi Masuda; Hiroaki Shimauchi, both of Kanagawa, Japan

[73] Assignee: Berg Tehnology, Inc., Reno, Nev.

[ * ] Notice: This patent issued on a continued prosecution application filed under 37 CFR 1.53(d), and is subject to the twenty year patent term provisions of 35 U.S.C. 154(a)(2).

[21] Appl. No.: 545,829

[22] PCT Filed: May 13, 1994

[86] PCT No.: PCT/US94/05399

§ 371 Date: Oct. 28, 1996

§ 102(e) Date: Oct. 28, 1996

[87] PCT Pub. No.: WO94/27343

PCT Pub. Date: Nov. 24, 1994

[30] Foreign Application Priority Data

| May 13, 1993 | [JP] | Japan | 5-111879 |
| Oct. 18, 1993 | [JP] | Japan | 6-259899 |
| Mar. 31, 1994 | [JP] | Japan | 6-063894 |

[51] Int. Cl.$^6$ .................................................. H01R 13/62
[52] U.S. Cl. ........................................................ 439/159
[58] Field of Search ................................ 439/160, 159, 439/152, 64

[56] References Cited

U.S. PATENT DOCUMENTS

| 3,724,322 | 4/1973 | Reed ........................................ 89/1.811 |
| 3,767,974 | 10/1973 | Donovan, Jr. et al. ............. 317/101 DH |
| 4,236,667 | 12/1980 | Crowley et al. ...................... 235/443 |
| 4,279,459 | 7/1981 | Sherman . | |
| 4,435,029 | 3/1984 | McKenzie ............................. 312/320 |
| 4,445,740 | 5/1984 | Wallace . | |
| 4,480,835 | 11/1984 | Williams .............................. 273/148 B |
| 4,501,455 | 2/1985 | Groseck ................................. 312/315 |
| 4,602,351 | 7/1986 | Shimamura et al. .................... 365/52 |
| 4,743,746 | 5/1988 | Murschall et al. ..................... 235/486 |
| 4,758,928 | 7/1988 | Wierec et al. ......................... 361/415 |
| 4,778,395 | 10/1988 | Narita ..................................... 439/71 |
| 4,778,401 | 10/1988 | Boudreau et al. ..................... 439/153 |
| 4,789,352 | 12/1988 | Kreinberg et al. .................... 439/260 |
| 4,810,200 | 3/1989 | Sakamoto .............................. 439/155 |
| 4,810,203 | 3/1989 | Komatsu ................................ 439/326 |

(List continued on next page.)

FOREIGN PATENT DOCUMENTS

| 0 167 356 A2 | 1/1986 | European Pat. Off. . |
| 0 267 001 B1 | 5/1988 | European Pat. Off. . |
| 0 274 684 A1 | 7/1988 | European Pat. Off. . |
| 0 385 750 A1 | 9/1990 | European Pat. Off. . |
| 0 540 308 A1 | 5/1993 | European Pat. Off. . |
| 2-230673 | 9/1990 | Japan . |
| 2115989 | 9/1983 | United Kingdom . |
| 2260634 | 10/1984 | United Kingdom . |

*Primary Examiner*—Neil Abrams
*Assistant Examiner*—Daniel Wittels
*Attorney, Agent, or Firm*—Woodcock Washburn Kurtz Mackiewicz & Norris LLP

[57] ABSTRACT

A connector apparatus for a card-like data processing medium comprises a frame (12) having opposing side walls (16a, 16b) that define a storage space (24a, 24b) of the connector apparatus. One end of the frame (12) defines an insertion inlet (22) for inserting a card-like data processing medium (30) in the storage space. A header containing a terminal array (32) is coupled to the end of the frame opposite the insertion inlet (22). An ejection mechanism (40a, 40b) is provided for ejecting the card-like data processing medium (30) from the storage space by manual operation of a push rod (48) that is coupled to the ejection mechanism (40). Means responsive to a control signal are provided for automatically decoupling the push rod (48) from the ejection mechanism to desable the ejection mechanism.

23 Claims, 12 Drawing Sheets

U.S. PATENT DOCUMENTS

| | | | |
|---|---|---|---|
| 4,836,790 | 6/1989 | Narita | 439/68 |
| 4,838,804 | 6/1989 | Banjo et al. | 439/325 |
| 4,864,458 | 9/1989 | Demorat, Jr. et al. | 361/491 |
| 4,918,572 | 4/1990 | Tarver et al. | 361/395 |
| 4,931,622 | 6/1990 | Ohtsuki et al. | 235/487 |
| 4,941,841 | 7/1990 | Darden et al. | 439/377 |
| 4,952,161 | 8/1990 | Komatsu | 439/159 X |
| 4,961,710 | 10/1990 | Komatsu | 439/267 |
| 4,975,074 | 12/1990 | Neidich | 439/310 |
| 4,975,805 | 12/1990 | Schmutzler | 361/399 |
| 4,980,856 | 12/1990 | Ueno | 364/900 |
| 4,984,994 | 1/1991 | Yamamoto | 439/267 |
| 4,991,058 | 2/1991 | Watkins et al. | 361/391 |
| 4,996,631 | 2/1991 | Freehauf | 361/415 |
| 5,000,694 | 3/1991 | Komatsu | 439/260 |
| 5,005,106 | 4/1991 | Kiku | 361/424 |
| 5,009,608 | 4/1991 | Shipe | 439/331 |
| 5,010,426 | 4/1991 | Krenz | 360/97.01 |
| 5,011,420 | 4/1991 | Sakamoto | 439/152 |
| 5,026,296 | 6/1991 | Hashiguchi | 439/159 |
| 5,031,076 | 7/1991 | Kiku | 361/424 |
| 5,033,972 | 7/1991 | Komatsu et al. | 439/153 |
| 5,036,250 | 7/1991 | Sluyterman | 315/8 |
| 5,036,430 | 7/1991 | Hills | 361/399 |
| 5,038,250 | 8/1991 | Uenaka et al. | 361/395 |
| 5,047,894 | 9/1991 | Onoda et al. | 361/395 |
| 5,051,101 | 9/1991 | Komatsu | 439/159 |
| 5,052,942 | 10/1991 | Rauterberg et al. | 439/326 |
| 5,055,106 | 10/1991 | Lundgren | 606/167 |
| 5,057,129 | 10/1991 | Kierzkowski et al. | 55/213 |
| 5,065,004 | 11/1991 | Mizuno et al. | 235/479 |
| 5,066,241 | 11/1991 | Hills | 439/260 |
| 5,074,800 | 12/1991 | Sasao et al. | 439/157 |
| 5,091,618 | 2/1992 | Takahashi | 235/441 |
| 5,092,799 | 3/1992 | Kimura | 439/924 |
| 5,115,376 | 5/1992 | Nakajima | 361/415 |
| 5,136,146 | 8/1992 | Anglin et al. | 235/441 |
| 5,136,467 | 8/1992 | Kaneda et al. | 361/392 |
| 5,139,430 | 8/1992 | Lewis et al. | 439/157 |
| 5,139,439 | 8/1992 | Shie | 439/359 |
| 5,140,501 | 8/1992 | Takahashi et al. | 361/415 |
| 5,145,398 | 9/1992 | Manabe | 439/341 |
| 5,146,069 | 9/1992 | Orimoto et al. | 235/475 |
| 5,149,276 | 9/1992 | Dixon | 439/159 |
| 5,151,847 | 9/1992 | Rautenberg | 361/395 |
| 5,152,697 | 10/1992 | Abe et al. | 439/152 |
| 5,155,663 | 10/1992 | Harase | 361/395 |
| 5,161,989 | 11/1992 | Okubo et al. | 439/159 |
| 5,162,002 | 11/1992 | Regnier | 439/637 |
| 5,176,523 | 1/1993 | Lai | 439/64 |
| 5,179,505 | 1/1993 | Matsuo | 361/395 |
| 5,181,857 | 1/1993 | Layser | 439/157 |
| 5,184,209 | 2/1993 | Kodai et al. | 257/679 |
| 5,184,282 | 2/1993 | Kaneda et al. | 361/395 |
| 5,197,894 | 3/1993 | Koike | 439/159 |
| 5,198,645 | 3/1993 | Martin et al. | 235/441 |
| 5,203,218 | 4/1993 | Orimoto et al. | 74/516 |
| 5,207,598 | 5/1993 | Yamada et al. | 439/636 |
| 5,217,384 | 6/1993 | Merten et al. | 439/304 |
| 5,218,519 | 6/1993 | Welch et al. | 361/415 |
| 5,222,897 | 6/1993 | Collins et al. | 439/157 |
| 5,224,873 | 7/1993 | Duffet et al. | 439/326 |
| 5,225,653 | 7/1993 | Martin et al. | 235/441 |
| 5,226,826 | 7/1993 | Nillson et al. | 439/72 |
| 5,233,502 | 8/1993 | Beatty et al. | 361/729 |
| 5,243,176 | 9/1993 | Schoenhenz | 235/475 |
| 5,257,414 | 10/1993 | Trahan et al. | 455/90 |
| 5,260,555 | 11/1993 | Sakamoto | 235/492 |
| 5,269,698 | 12/1993 | Singer | 439/157 |
| 5,275,573 | 1/1994 | McCleerey | 439/159 |
| 5,281,157 | 1/1994 | Abe et al. | 439/159 OR |
| 5,283,713 | 2/1994 | Nagafuji et al. | 361/796 |
| 5,299,089 | 3/1994 | Lwee | 361/684 |
| 5,304,070 | 4/1994 | Bertho et al. | 439/157 |
| 5,318,452 | 6/1994 | Brennian, Jr. et al. | 439/79 |
| 5,320,540 | 6/1994 | Lwee | 439/64 |
| 5,324,204 | 6/1994 | Lwee | 439/64 |
| 5,401,176 | 3/1995 | Lwee | 439/64 |
| 5,427,534 | 6/1995 | Spickler et al. | 439/64 |
| 5,451,168 | 9/1995 | Shuey | 439/159 |
| 5,490,791 | 2/1996 | Yamada et al. | 439/159 |
| 5,490,792 | 2/1996 | Sugita | 439/160 X |
| 5,499,925 | 3/1996 | Lwee | 439/157 |

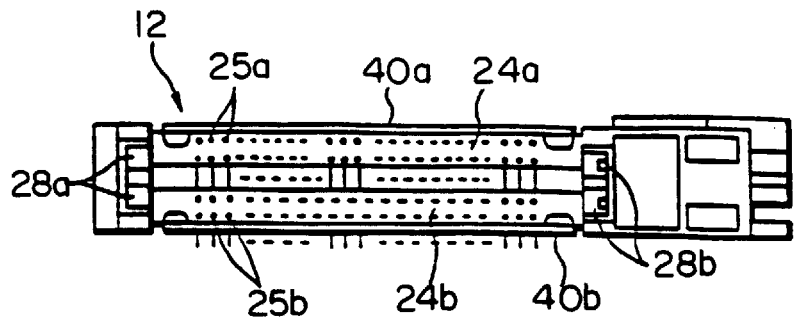
FIG. 2
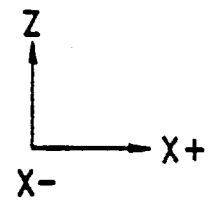
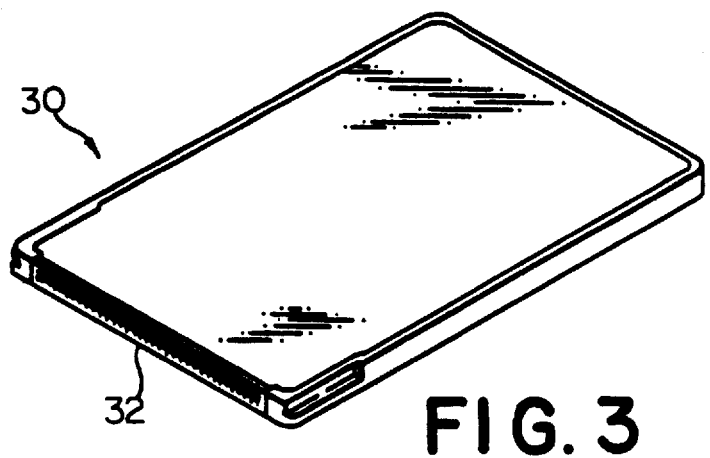
FIG. 3

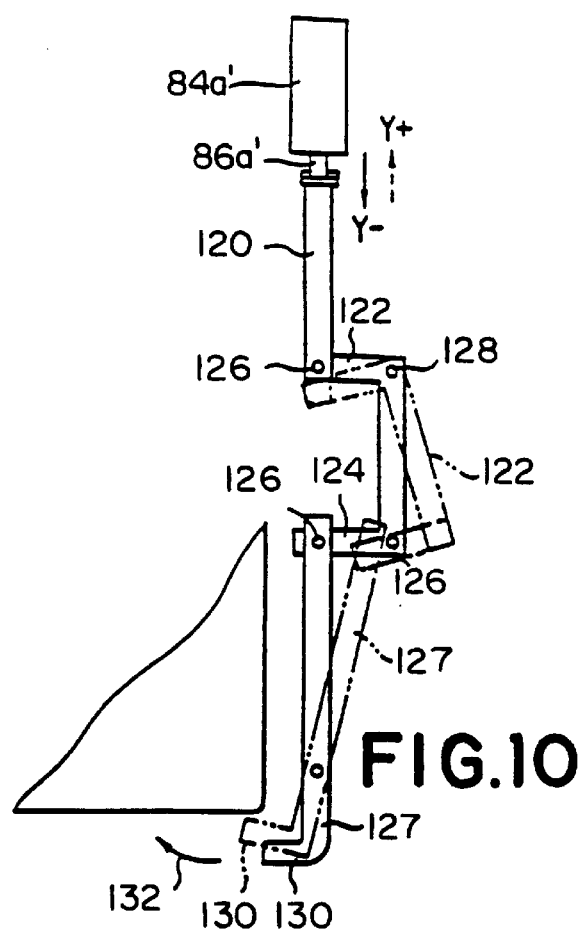
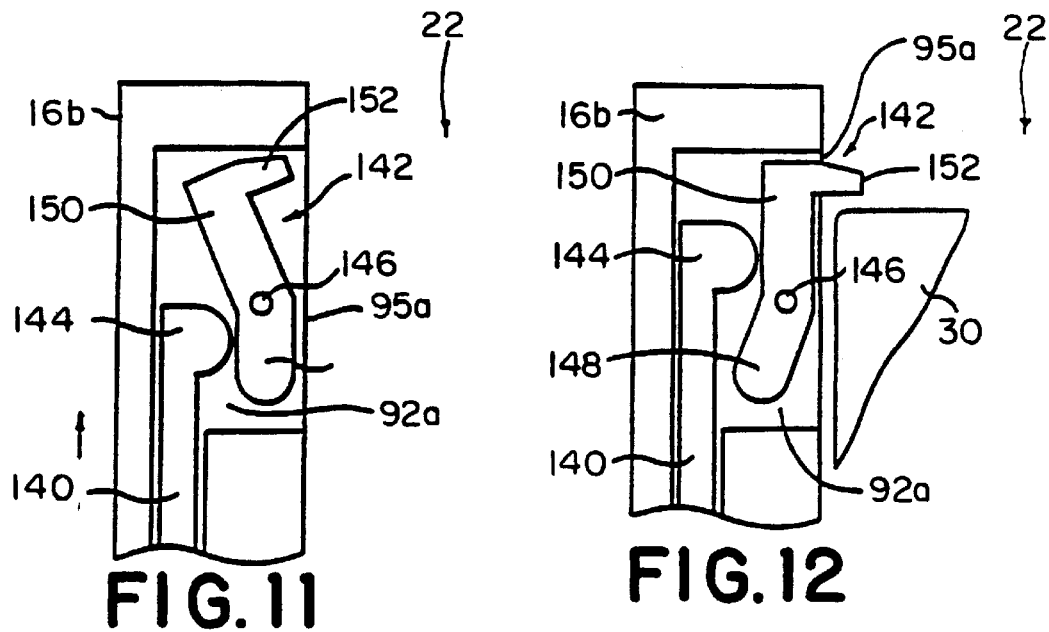

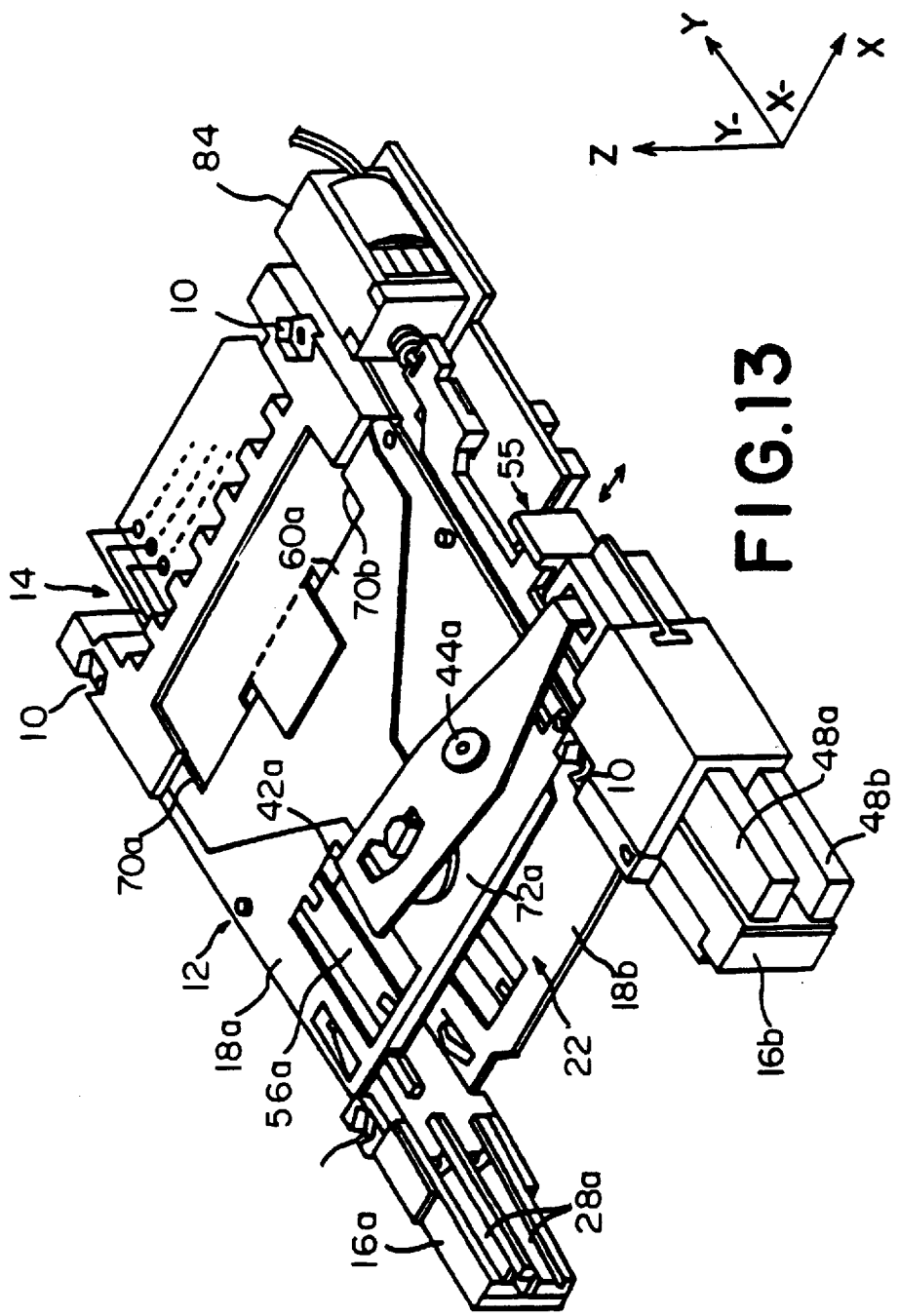

CONNECTOR APPARATUS

BACKGROUND

1. Field of the Invention

The present invention relates to a connector apparatus for mounting, in an electronic data processing device, a memory card or other card-like electronic data processing medium, such as a thin-type hard disc drive package.

2. Description of the Prior Art

A connector apparatus for connecting card-like data processing mediums to an electronic device, such as a computer, is disclosed in Japanese Utility Model Publication 4-52265. The connector apparatus includes a rectangular housing having an insertion inlet at its front end and a plurality of male terminals at a rear end. A slide plate is arranged over an upper surface of the housing and is slidable along a length of the housing from the front end to the rear end. The slide plate has hooks designed to engage the forward end of a card-like data processing medium when the medium is inserted in the housing. A manual operation member, such as a push rod, is mounted on one side of the housing and is slidable along the length of the housing. The slide plate and push rod are coupled together through a swing lever rotatably mounted on the upper plate of the housing. Movement of the push rod toward the rear end of the housing is translated through the swing lever into movement of the slide plate in the opposite direction. The connector apparatus is typically mounted in the casing of an electronic device such as a personal computer or one of its peripheral devices. The push rod usually protrudes from the casing of the computer to allow manual operation thereof.

When a card-like data processing medium is inserted in the housing of the connector device and pushed toward the male terminals, the female terminals disposed in the front end of the card-like data processing medium electrically connect to the male terminals of the connector apparatus so that the card-like data processing medium is connected to the electronic device. To eject the card-like data processing medium, the push rod is pushed toward the rear end of the housing causing the slide plate to move in the opposite direction, i.e., toward the insertion inlet. As the slide plate moves toward the insertion inlet, the hooks on the slide plate engage the forward end face of the card-like data processing medium thereby disconnecting the card-like data processing medium and urging it backward out of the connector apparatus.

Inadvertent ejection or removal of a card-like data processing medium from such a connector apparatus can adversely affect the operation of an electronic apparatus, such as a computer, to which the connector is attached. Accordingly, there is a need for a connector apparatus that prevents inadvertent removal and/or ejection of a card-like medium from the connector apparatus. The present invention satisfies this need.

SUMMARY OF THE INVENTION

The present invention is directed to a connector apparatus for a card-like data processing medium. According to the present invention, the connector apparatus comprises a frame having opposing side walls spaced at an interval substantially equal to the width of the card-like data processing medium. The opposing side walls define a storage space. One end of the frame defines an insertion inlet for inserting the card-like data processing medium into the storage space. A header is coupled to the end of the frame opposite the insertion inlet. The header contains a terminal array for electrically connecting with a mating terminal array disposed in a forward end face of the card-like data processing medium. The connector apparatus further comprises an ejection mechanism for ejecting the card-like data processing medium from the storage space of the connector apparatus. The ejection mechanism includes a push rod that is coupled to the ejection mechanism for manually operating the ejection mechanism.

In accordance with one feature of the present invention, the connector apparatus further comprises means responsive to a control signal for automatically decoupling the push rod from the ejection mechanism thereby disabling the ejection mechanism. Preferably, the ejection mechanism comprises a slide plate movably mounted on the frame and operable to slide toward and away from the header, and a swing lever rotatably mounted on the connector apparatus and arranged to rotate in a plane parallel to the plane of the slide plate. One end of the pivot lever is coupled to the slide plate and the other end of the pivot lever is detachably coupled to the push rod. The slide plate has ejection hooks adapted to engage with the forward end face of the card-like data processing medium when it is inserted in the storage space. Movement of the push rod toward the header is transmitted through the swing lever into movement of the slide plate toward the insertion inlet. With this type of ejection mechanism, the push rod decoupling means operates to decouple the push rod from the end of the swing lever, thereby disabling the ejection mechanism.

According to another feature of the present invention, the connector apparatus may comprise, alone or in combination with the push rod decoupling means, a card locking member movably mounted on at least one of the side walls proximate the insertion inlet of the frame. The card locking member is responsive to a force applied thereto to move at least partially into the insertion inlet, thereby preventing the card-like data processing medium from being withdrawn from the storage space of the connector apparatus. A drive means is provided that responds to a control signal for automatically and selectively applying the requisite force to the card locking member. Preferably, the drive means comprises a solenoid having a drive shaft adapted to move lengthwise of the one side wall, and at least one transmission arm coupled between the drive shaft and the card locking member for transmitting movement of the drive shaft into movement of the card locking member. In various embodiments described hereinafter, the card locking member may alternatively comprise a cam, a pivot arm or a locking arm.

According to yet another aspect of the present invention, the connector apparatus may comprise means for selectively and automatically latching the push rod of the ejection mechanism in place to prevent manual operation of the push rod, thereby disabling the ejection mechanism.

Additional features and advantages of the present invention will become evident hereinafter.

BRIEF DESCRIPTION OF THE DRAWINGS

FIG. 2 is a front view showing the connector apparatus of FIG. 1.

FIG. 3 is a perspective view showing a memory card for use with the connector apparatus of FIG. 1.

FIG. 10 is a schematic view illustrating a card removal preventing means in accordance with a third embodiment of the connector apparatus of the present invention.

FIG. 11 is a schematic view illustrating a memory card removal preventing means in accordance with a fourth embodiment of the connector apparatus of the present invention.

FIG. 12 is a schematic view illustrating the preventing means of FIG. 11 in a latched position.

FIG. 13 is a perspective view showing a connector apparatus in accordance with a fifth embodiment of the present invention;

DETAILED DESCRIPTION OF THE PREFERRED EMBODIMENTS

Figure 1:
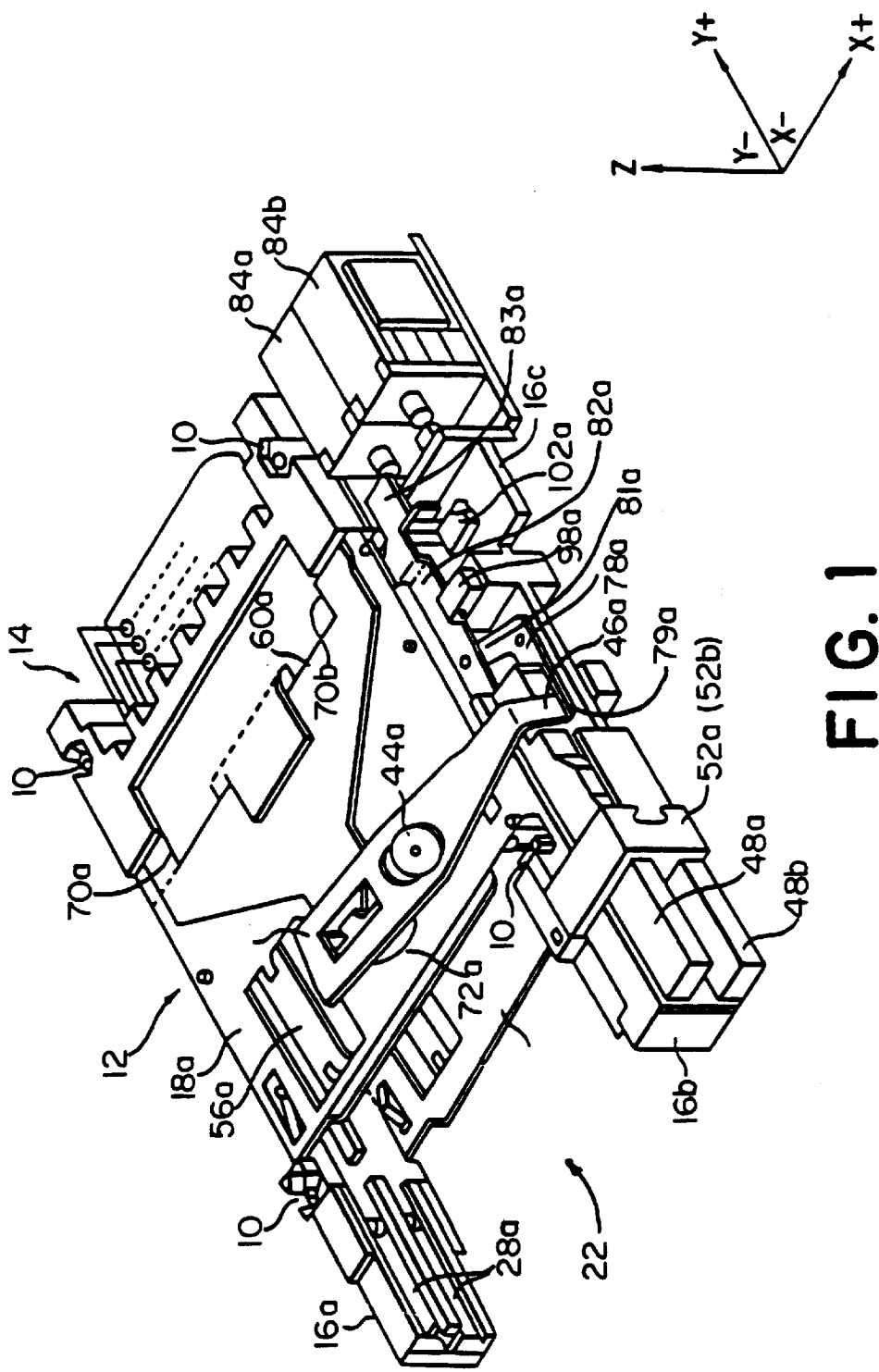
FIG. 1 is a perspective view showing a connector apparatus according to a first embodiment of the present invention.

FIG. 1 shows a connector apparatus in accordance with a first embodiment of the present invention. A connector apparatus of the present embodiment can hold two card-like data processing mediums therein. The connector apparatus has a substantially rectangular frame 12 and a header 14 connected to the rear end of the frame 12. The frame 12 has a pair of opposing side walls 16a, 16b spaced at an interval substantially equal to the width of a card-like data processing medium. Top and bottom plates 18a, 18b may be coupled to the frame 12. A front end of the frame defines an insertion inlet 22 for receiving memory cards. A support plate 16c extends outwardly along side wall 16b to support component parts (described hereinafter) for operating the connector apparatus. Mounting members 10 are provided to facilitate mounting of the connector apparatus in an electronic data processing device, such as a personal computer or a peripheral device.

In the present embodiment, the connector apparatus is intended for use in a data processing device that has the ability to provide one or more control signals for controlling the connector apparatus in accordance with a control program, as described hereinafter. As shown in FIG. 2, the storage space of the housing 12 may be divided horizontally into upper and lower storage spaces 24a and 24b. One card-like data processing medium, such as a memory card, can be inserted in each of the upper and lower storage spaces 24a and 24b.

Referring to FIG. 3, a memory card 30 typically comprises a card-like package containing a memory element, such as a random access memory (RAM) or read only memory (ROM). The front end face of the memory card 30 typically has a female terminal array 32 adapted to mate with corresponding male terminal arrays 26a, 26b of the connector apparatus. When a nonvolatile RAM is used as the memory element in a memory card 30, the card 30 can be withdrawn from a data processing device after data stored on the card 30 has been transferred to the data processing device. It is understood that any type of card-like data processing medium can be employed with the connector apparatus of the present invention, and the present invention is not limited to use with memory cards. For example, the card-like data processing medium may comprise a thin-type hard disc drive or may perform an I/O function.

Referring again to FIGS. 1 and 2, guide slots 28a, 28b are formed lengthwise along the inner surfaces of the respective side walls 16a, 16b to guide memory cards into and out of the upper and lower storage spaces 24a, 24b. The header 14 has two sets of conductive male terminal arrays. An upper male terminal array 26a is disposed in the upper storage space 24 for connecting to the female terminal array 32 of a memory card 30 inserted in the upper storage space 24a. Similarly, a lower male terminal array 26b is disposed in the lower storage space 24b for connecting to memory cards inserted in that storage space.

The connector apparatus has an upper ejection mechanism 40a corresponding to the upper storage space 24, and a lower ejection mechanism 40b corresponding to the lower storage space 26. The upper and lower ejection mechanisms 40a and 40b are basically similar to each other in terms of their configuration. In the Figures, the letter "a" is added to reference numerals representing constituent elements of the upper ejection mechanism 40a, and the letter "b" is added to reference numerals representing constituent elements of the lower ejection mechanism 40b. Only the upper ejection mechanism 40a is described below, it being understood that, unless expressly stated otherwise, the operation of the lower ejection mechanism is similar. Additionally, for convenience illustration only, directions $X_-$, $X_+$, $Y_-$ and $Y_+$ are defined as illustrated in FIG. 1.

Figure 4:
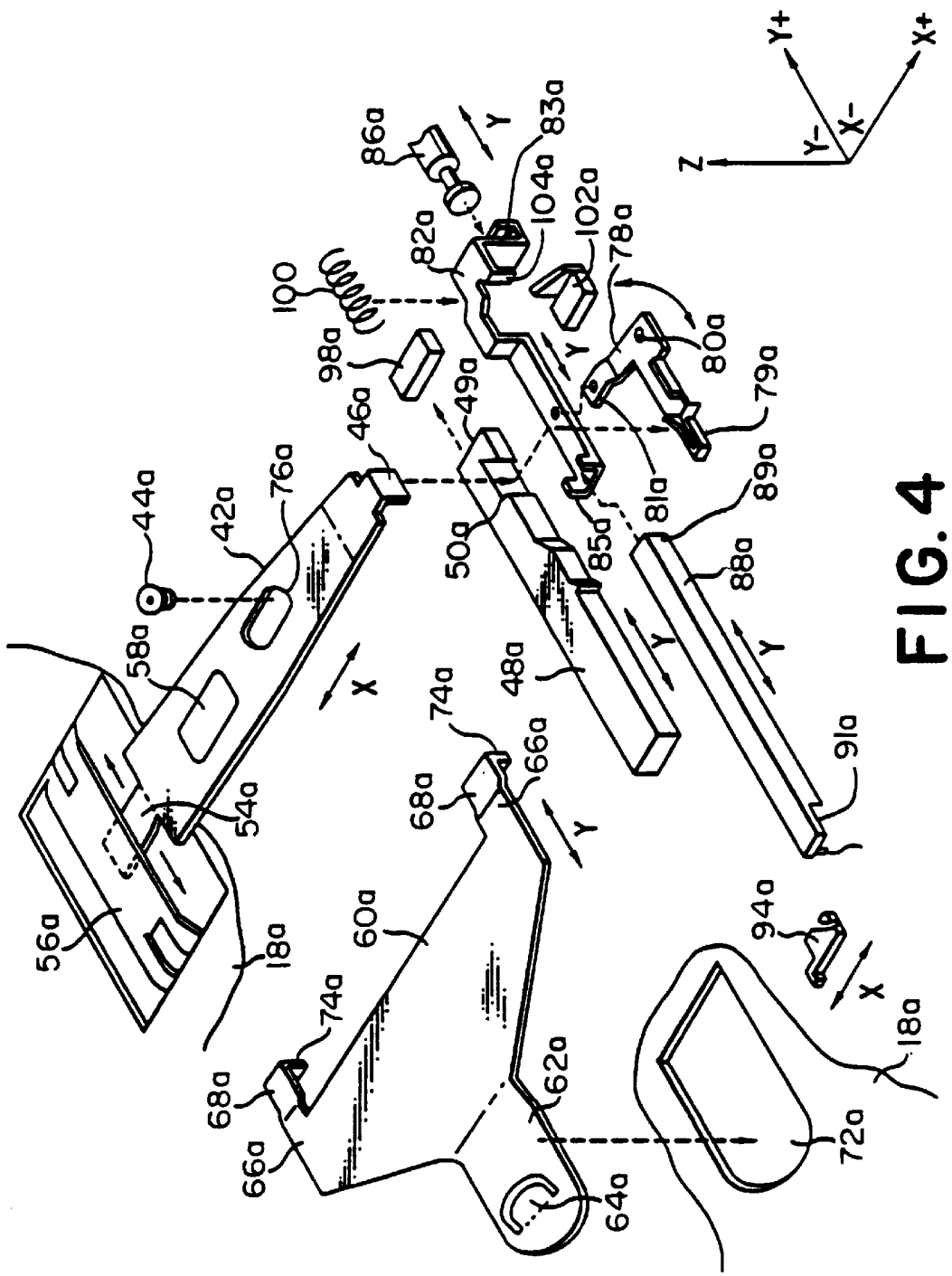
FIG. 4 is a perspective, exploded view of various components of the connector apparatus of FIG. 1.

Referring to FIGS. 1 and 4, a swing lever 42a is pivotally supported by a rotation shaft 44a on the upper plate 18a near the insertion inlet 22 of the housing 12. The swing lever 42a is adapted to rotate about the rotation shaft 44a. One end portion of the swing lever 42a comprises a downwardly bent claw 46a. The claw 46a is engageable with a cutout 50a on one end portion of a push rod 48a. The push rod 48a slides along the Y direction in a guide 52a provided on the side wall 16b. A spring (not shown) may be used to facilitate the sliding motion of the push rod 48a. A tongue-like piece 54a is provided on the other end of the swing lever 42a. The tongue-like piece 54a is set in slidable contact with the inside of a band-like slide guide 56a that is somewhat raised from the surface of the upper plate 18a. The slide guide 56a is formed by, for example, punching the upper plate 18a. When the claw 46a is engaged with cutout 50a, movement of the push rod 48a in the Y direction causes the swing lever 42a to rotate about the rotation shaft 44a along the upper surface of the upper plate 18a.

Another claw 58a of the swing lever 42a projects below the lever 42a and toward the upper plate 18a. Claw 58a may be formed by, for example, punching the swing lever 42a. The claw 58a engages a corresponding claw 64 located on a base end section 64a of the slide plate 60a. Rotation of the swing lever 42a will therefore cause the slide plate 60a to move in the $Y_{+/-}$ direction. Thus, the swing lever 42a is coupled between the push rod 48a and the slide plate 60a. Movement of the push rod in the $Y_+$ direction will be transmitted through the swing lever 42a into movement of the slide plate in the opposite direction $(Y_-)$, and vice versa.

Arms 66a extend from both side edges of the slide plate 60a toward the header 14. Bent sections 68a are provided at the distal ends of each arm 66a. The bent sections 68a are stepped relative to the slide plate 60a so that they ride in corresponding cutouts 70a formed in the upper plate 18a. Similarly, the base end portion 64a of the slide plate 60a is stepped relative to the slide plate 60a so that it rides in another cutout 72a provided in the upper plate 18a. The cutouts 70a and 72a of the upper plate 18a serve as slide guides to prevent the slide plate 60a from moving in the X direction. The forward ends of the bent sections 68a of the arms 66a are further bent to provide ejection hooks 74a. The hooks 74a are intended to engage the forward end face of a memory card 30 when the card is inserted into the storage space 24a of the connector apparatus.

Referring still to FIGS. 1 and 4, the swing lever 42a has an elongated hole 76a at its middle area where the rotation shaft 44a is loosely fitted. The elongated hole 76a allows the swing lever 42a to move in the X direction a distance equal to the difference between the length of the hole 76a and the diameter of the rotation shaft 44a. When the swing lever 42a is moved in the $X_-$ direction, the claw 46a of the swing lever 42a engages with the cutout 50a of the push rod 48a and, therefore, reciprocatory movement of the push rod 48a will cause the swing lever 42a to rotate. However, when the swing lever 42a is moved in the $X_+$ direction, the claw 46a of the swing lever 42a will move out of engagement with the cutout 50a on the push rod 48a and, as a result, movement of the push rod 48a will not be transmitted to the swing lever 42a. Thus, the swing lever 42a can be disengaged, i.e., decoupled, from the push rod.

Referring mainly to FIG. 4, engagement and disengagement of the swing lever 42a is performed by an L-shaped plate 78a supported on the support plate 16a. The L-shaped plate 78a has its middle portion 80a rotatably supported on the support plate 16a so that it rotates in a horizontal plane over the support plate 16a. One end 79a of the L-shaped plate 78a engages with the claw 46a of the swing lever 42a, and the other end 81a of the L-shaped plate 78a is coupled to a transmission arm 82a. The transmission arm 82 slides in the Y direction over the support plate 16c. A proximal end 83a of the transmission arm 82a is coupled to a drive shaft 86a of a solenoid 84a positioned at the rear end of the support plate 16c, as best shown in FIG. 1. The transmission arm 82a is biased in the $Y_-$ direction by a spring 100.

Movement of the solenoid drive shaft 86a is transmitted through the transmission arm 82a to the L-shaped plate 78a. A distal end 85a of the transmission arm 82a is coupled to a proximal end 89a of a second transmission arm 88a. A cylindrical projection 90a projects from the lower surface of the second transmission arm 88a at its distal end 91a. As described hereinafter, the second transmission arm 88a, together with associated component parts, comprises means for locking a memory card 30 in the connector apparatus to prevent its removal.

Figure 5:
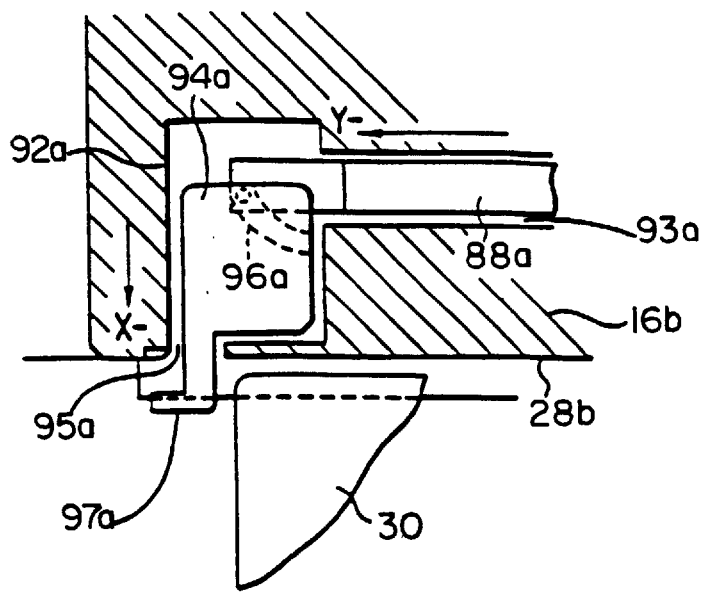
FIG. 5 is a schematic view illustrating further details of the card removal preventing means of the connector apparatus of FIG. 1.
Figure 6:
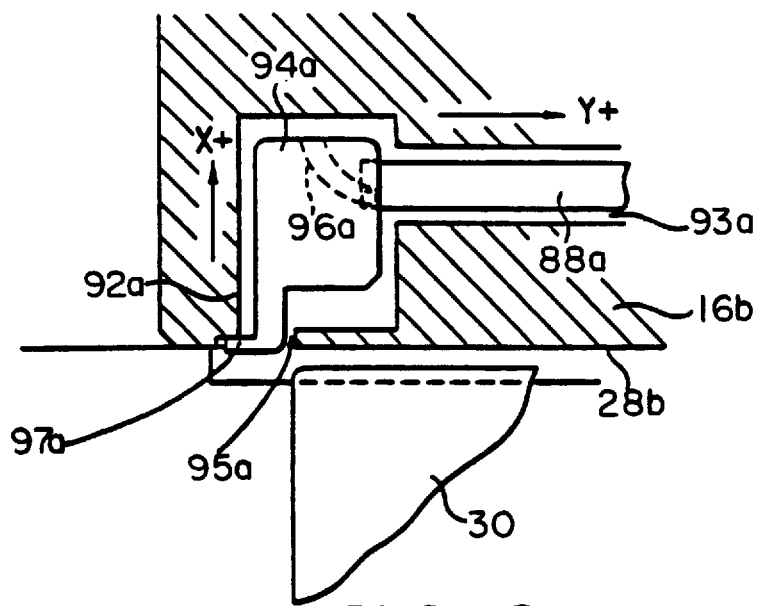
FIG. 6 is a schematic view illustrating further details of the connector apparatus of FIGS. 1 and 5.

Referring to FIG. 5, the second transmission arm 88a extends through a lengthwise channel 93a formed in the side wall 16b of the connector apparatus. A recess 92a formed in the side wall 16b communicates with the channel 93a and has an opening 95a leading to the insertion inlet of the connector apparatus. A card locking member is movably mounted in the recess 92a. In the present embodiment, the card locking member comprises a grooved cam 94a adapted to slide within the recess 92a in the $X_{+/-}$ directions. A projection 97a on the cam 94a is adapted to extend through the opening 95a. As illustrated in FIG. 5, when a memory card 30 is inserted in the connector apparatus, the cam 94a can be moved in the $X_-$ direction such that the projection 97a extends into the insertion inlet and blocks the memory card 30, thereby preventing its removal. Thus, the memory card 30 is locked in the connector apparatus. As shown in FIG. 6, however, the cam 94a can be drawn back into the recess 92a (i.e., moved in the $X_+$ direction) such that the projection 97a is flush with the guide slot 28b of the side wall 16b and therefore does not prevent removal of the memory card 30.

The cam 94a has an angled groove 96a that engages the projection 90a of the second transmission arm 88a. Essentially, the projection 90a rides in the groove 96a. The groove 96a is angled with respect to the X-Y plane such that the cam 94a is pushed toward the insertion inlet 22 by the projection 90a when the second transmission arm 88a moves in the $Y_-$ direction, and is pushed back into the recess when the arm 88a moves in the $Y_+$ direction. Such an arrangement is sometimes referred to in the art as a box-cam.

Summarizing the above, when the drive shaft 86a of the solenoid moves in the $Y_-$ direction, the first transmission arm 82a moves with it causing the end 79a of the L-shaped plate 78a to swing away from the connector apparatus. As the end 79a of the L-shaped plate swings away from the connector apparatus, it pulls the swing lever 42a in the $X_+$ direction and causes the end 46a of the swing lever 42a to disengage (i.e., decouple) from the slot 50a in the push rod 48a. At the same time, the movement of the first transmission arm 82a is transmitted directly to the second transmission arm 88a. As the second transmission arm 88a moves in the $Y_-$ direction, the projection 90a on the underside of the arm 88a engages the angled groove 96a in the claw member 94a causing the claw member 94a to move toward the insertion inlet such that the projection 97a of the claw member 94a moves into the insertion inlet and blocks any memory card 30 from being removed. At this point, therefore, any memory card in the connector apparatus is locked in the apparatus by projection 97a, and the push rod 48a is decoupled from the swing-lever 42a, thereby disabling the ejection mechanism.

Activation of the solenoid 84a is controlled by first and second control signals, that may be generated by a control circuit (not shown) or by any other means. For example, the control signals may be provided at an output port of the host data processing device or computer. In the present embodiment, a first control signal causes the solenoid drive shaft 86a to move in the Y_ direction, and a second control signal causes the solenoid drive shaft 86a to move in the Y$_+$ direction. A permanent magnet and spring (not shown) may be used to hold the transmission arms 82a, 88a in place in the event one of the control signals is somehow cut off.

Preferably, the upper terminal array 26a in the upper storage space 24a of the connector apparatus includes two detection terminals that operate to detect electrical connection between a memory card and the upper terminal array 26a. When a memory card is manually pushed into the upper storage space 24a, a program operating on the associated data processing device (i.e., computer) can detect connection of the memory card via the detection terminals. The program may then cause a first control signal to be supplied to the solenoid 84a, thereby moving the drive shaft 86a of the solenoid 84a in the Y_ direction. As explained above, this will cause the push rod 48a to be decoupled or disengaged from the swing lever 42a, thereby disabling the upper ejection mechanism. Additionally, the card locking member (e.g., cam 94a) will move at least partially into the insertion port 22 such that the projection 97a blocks the memory card 30 and prevents it from being manually withdrawn.

When the memory card 30 is to be withdrawn, the program will cause a second control signal to be supplied to the solenoid 84a, causing the drive shaft 86a to move in the Y$_+$ direction back to its initial position. As can be appreciated, movement of the drive shaft 86a back to its original position will re-engage the push rod 48a and swing lever 42a and will move the cam 94a back into the recess 92a such that the projection 97a is flush with the sidewall 16b and no longer blocks the path of the memory card. The push rod 48a can then be operated in order to eject the memory card 30.

Preferably, two switches are employed in connection with a suitable program to prevent operators from manually operating the push rod when it is disengaged, and to confirm whether or not the solenoid 84a is operating properly. As best shown in FIGS. 1 and 4, a first proximity switch 98a is arranged on the support plate 16c near the free end 49a of the push rod 48a. The proximity switch 98a is positioned such that, when the swing lever 42a has been disengaged from the slot 50a on the push rod 48a, and an operator thereafter pushes the push rod inward (i.e., toward the header end of the connector apparatus) not realizing that the push rod has been disengaged, the free end 49a of the push rod 48a will contact the proximity switch 98a. A control circuit, or other means, operating in accordance with the program (not shown) can be coupled to the proximity switch in order to sound an alarm or display an error message on an associated display screen (not shown) whenever the proximity switch 98a is activated. Thus, an operator can be warned that he or she is attempting to operate the push rod 48a when it has been disengaged (i.e., decoupled from the swing lever 42a).

A second switch 102a is positioned near the drive shaft 86a of the solenoid 84a to detect whether or not the solenoid 84a is operating properly. Referring to FIG. 4, a contact 104a of the transmission arm 82a engages, and therefore closes, the second switch 102a whenever the drive shaft 86a of the solenoid 84a is moved in the Y_ direction to its extended position. When the drive shaft 86a moves in the Y$_+$ direction back to its initial position, the contact 104a moves away from the switch 102a causing the switch 102a to re-open. Thus, the opening and closing of the switch 102a can be detected in order to verify the proper operation of the solenoid.

Figure 7:
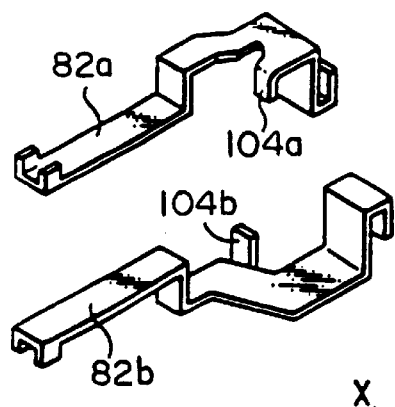
FIG. 7 is a perspective view showing further details of upper and lower transmission arms of the connector apparatus of FIGS. 1 and 4.

The arrangement of the ejection mechanism, etc., for the lower storage space 24b is substantially similar to that of the upper storage space 24a described above. As shown in FIG. 1, the solenoid 84b of the ejection mechanism for the lower storage space 24b is located next to the solenoid 84a of the upper ejection mechanism. As shown in FIG. 7, due to the relative positions of the solenoids 84a and 84b, the shapes of the upper and lower transmission arms 82a and 82b are somewhat different from each other.

Figure 9:
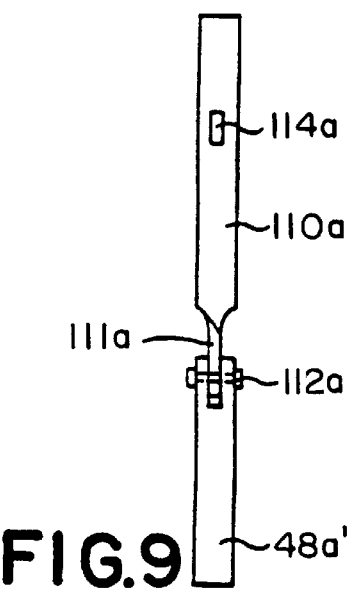
FIG. 9 is a side view of the mechanism illustrated in FIG. 8.
Figure 8:
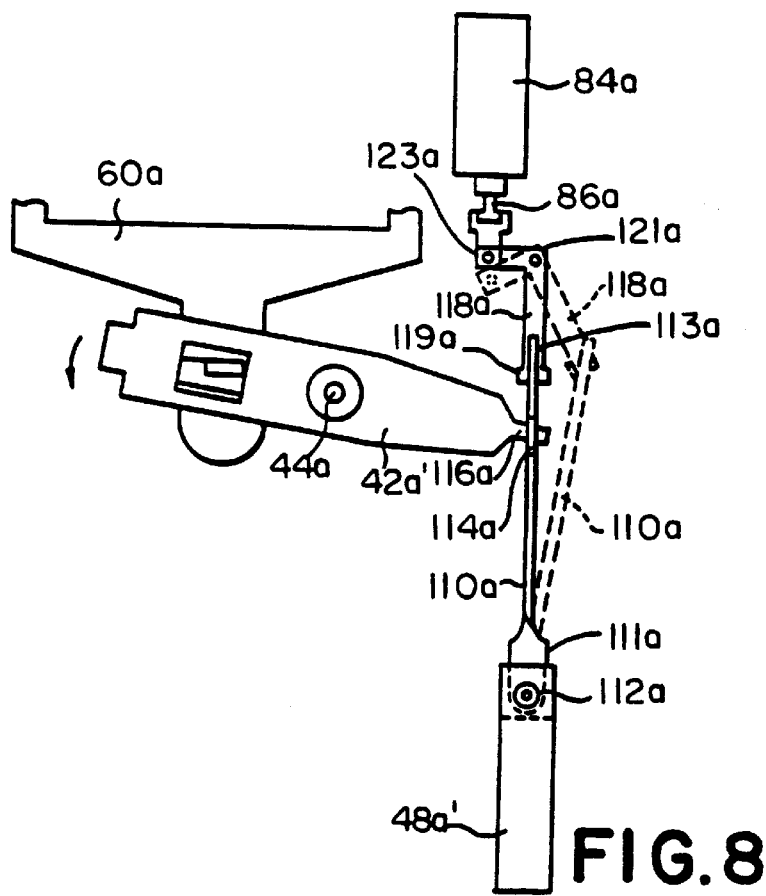
FIG. 8 is a plan view illustrating a push rod engagement/disengagement mechanism in accordance with a second embodiment of the connector apparatus of the present invention.

FIGS. 8 and 9 illustrate a second embodiment of the push rod disengagement means and the memory card removal preventing means of the present invention. For convenience, only those aspects of the respective mechanisms that differ from those of the first embodiment are illustrated in FIGS. 8 and 9. The second embodiment differs from the first embodiment in the following two ways. The first difference is that a push rod 48a', L-shaped plate 118a and coupling rod 110a are employed in the second embodiment in place of the push rod 48a, L-shaped plate 78a and transmission arm 82a of the first embodiment. The second difference is that the swing lever 42a' does not have an elongated opening 76a like the swing lever 42a of the first embodiment, and therefore, the swing lever 42a' of the second embodiment is not capable of moving in the X direction. The swing lever 42a of the second embodiment merely rotates about the rotation shaft 44a.

The coupling rod 110a is plate-like and is twisted at one end 111a so that it lies substantially parallel to the plane of the connector apparatus. The twisted end 111a of the coupling rod 110a is rotatably coupled to the end of the push rod 48a using another rotation shaft 112a. A hole 114a is opened in the vertical section of the coupling rod 110a, and a claw 116a on one end of the swing lever 42a' extends through the hole 114a. As in the first embodiment, the other end of the swing lever 42a' is coupled to a slide plate 60a. During normal operation, movement of the push rod 48a' in the Y$_+$ direction is translated via the swing lever 42a' into movement of the slide plate 60a in the opposite direction, thereby ejecting a memory card (not shown) inserted in the connector apparatus.

As further shown in FIG. 8, the other end 113a of the coupling rod 110a is loosely coupled to one end 119a of the L-shaped plate 118a. Specifically, the end 119a of the L-shaped plate 118a is bent to form an area of U-shaped cross section. The end 113a of the coupling rod 110a is then inserted into the U-shaped area to provide a loose coupling between the end 113a of the rod 110a and the end 119a of the L-shaped plate 118a. The right-angle portion 121a of the L-shaped plate 118a is pivotally supported on the support plate 16c (not shown) and its other end 123a is coupled to the drive shaft 86a of the solenoid 84a.

When a memory card is inserted in the connector apparatus, and the drive shaft 86a of the solenoid 84a is driven in the Y_ direction, the U-shaped end 119a of the L-shaped plate 118a is rotated in the X$_+$ direction. As shown in FIG. 8, the coupling rod 110a moves with the end 119a of the L-shaped plate 118a causing the claw 116a of the swing lever 42a' to disengage from the hole 114a of the coupling rod 110a. Consequently, the push rod 48a' is decoupled from the swing lever 42a' and therefore movement of the push rod 48a' will not be transmitted to the swing lever 42a'. The ejection mechanism is therefore disabled.

When the drive shaft 86a of the solenoid 84a is driven in the Y$_+$ direction back to its original position, the L-shaped plate 118a will rotate back to its initial position and the claw 116a of the swing lever 42a' will again extend through and engage the hole 114a in the coupling rod 110a. Movement of the push rod 48a' will once again cause the swing lever 42a' to rotate.

FIG. 10 shows a third embodiment of the present invention. The third embodiment is similar to the first embodiment except that the card locking member comprises a locking arm 127, rather than the cam 94a of the first embodiment. Additionally, as shown in FIG. 10, a straight coupling arm 120, L-shaped coupling arm 122 and lateral coupling arm 124 are sequentially connected between the drive shaft 86a' of the solenoid 84a' and the locking arm 127. The respective coupling arms are coupled together with rotation shafts 126 which are not fixed to the support plate 16c. An intermediate portion of the L-shaped coupling arm 122 is rotatably journalled by a rotation shaft 128 that is fixed to the support plate 16c. Thus, while the rotation shaft 128 is stationary, the rotation shafts 126 move with their respective coupling arms.

When the drive shaft 86a' of the solenoid 84a is moved in the Y_ direction, that motion is transmitted through the coupling arms 120, 122 and 124 to the locking arm 127. As shown, this causes a projection 130 on the forward end of the locking arm 127 to move in the direction of the arrow 132. As a result, the projection 130 moves at least partially into the insertion inlet where it blocks the end of a memory card 30 and prevents its removal.

When the drive shaft 86a' of the solenoid 84a' moves in the Y_+ direction back to its original position, the locking arm 127 moves back to its initial position (indicated by the solid lines in FIG. 10) such that the projection 130 no longer blocks the memory card 30. Thus, in this position, the memory card can be removed from the connector apparatus. It is understood that a separate, but similar set of coupling and locking arms would be provided for the lower storage space 24b.

FIGS. 11 and 12 show a fourth embodiment of the present invention. The connector apparatus of the fourth embodiment is similar to that of the first embodiment except that the means for locking a card in the connector apparatus differs from the first embodiment in the following two ways. First, the forward end of the second transmission arm 140 has a semi-spherical projection 144 rather than the cylindrical projection 90a of the first embodiment. Secondly, in the fourth embodiment, the card locking member comprises a pivot arm 142 instead of the cam 94a of the first embodiment.

The pivot arm 142 is substantially L-shaped in configuration and is rotatably mounted within the recess 92a using a rotation shaft 146. The pivot arm has first and second ends 148, 150 that extend from the rotation shaft in opposite directions and at a slight angle to each other. Specifically, the first end 148 bends slightly toward the transmission arm 140.

As shown in FIG. 11, when the transmission arm 140 is in its initial position, the projection 144 of the transmission arm 140 engages the first end 148 of the pivot arm 142 causing the second end 150 to remain substantially within the recess 92a. As shown in FIG. 12, however, when the transmission arm 140 moves in the Y_ direction (in response to movement of the solenoid drive shaft 86a), the projection 144 on the transmission arm 140 engages the back surface of the second end 150 of the pivot arm 142 causing that end 150 to move toward the opening 95a in the side wall 16b. When the pivot arm 142 is in the position illustrated in FIG. 12, a projection 152 on the second end 150 of the pivot arm 142 extends through the opening 95a and into the insertion inlet 22 of the connector apparatus, thereby blocking a memory card 30 inserted in the apparatus and preventing its removal. When the transmission arm 140 moves back to its initial position (i.e., FIG. 11), the projection 144 will again engage the first end 148 of the pivot arm 142 causing the second end 150 to rotate back into the recess 92a. The memory card 30 can then be removed from the connector apparatus.

FIGS. 13–20 show a fifth embodiment of the connector apparatus according to the present invention. The fifth embodiment as shown in FIG. 13 is similar to that of the first embodiment except that the fifth embodiment utilizes only one solenoid 84 and two contact switches 65 and 53. Despite a smaller number of parts, the fifth embodiment performs almost the same functions as the first embodiment.

Referring to FIG. 13, a swing lever 42a of the fifth embodiment does not have an elongated hole 76a of the first embodiment as shown in FIG. 4. Since the swing lever 42a of the fifth embodiment is pivotally supported by a rotation shaft 44a on a top plate 18a, the swing lever does not move in the X_+ or X_ direction.

Figure 14:
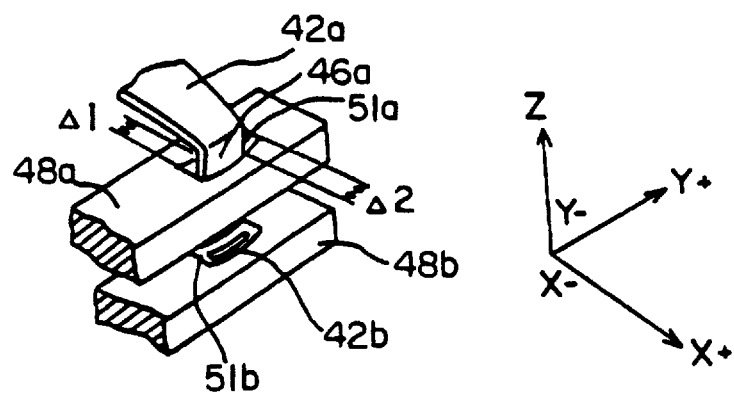
FIG. 14 is an enlarged perspective view showing ends of a pair of push rods in accordance with a fifth embodiment of the present invention.

FIG. 14 shows that instead of a cutout 50a of the first embodiment, a push rod 48a of the fifth embodiment has a through hole 51a, which is elongated on the Y axis. A downwardly bent claw 46a of the swing lever 42a engages the through hole 51a, and the width of the though hole 51a is larger than that of the bent claw 46a by Δ1 and Δ2 along the Y axis. Thus, when the push rod 48a is pushed inward in the Y_+ direction, the push rod 48a moves a distance of Δ1 before an inside wall of the through hole 51a contacts a lateral surface of the bent claw 46a on the Y_ side. Similarly, a lower push rod 48b also has an elongated through hole 51b, and the lower swing lever 42b faces the upper swing lever 42a and engages the through hole 51b.

Figure 15:
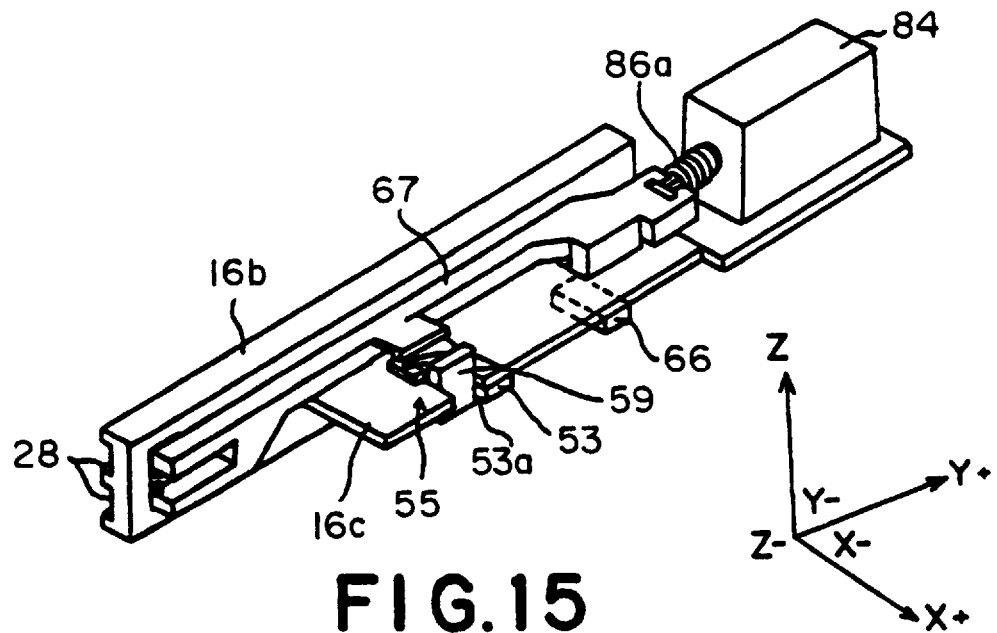
FIG. 15 is a perspective view showing a transmission arm and a moving part in accordance with a fifth embodiment of the present invention.
Figure 16:
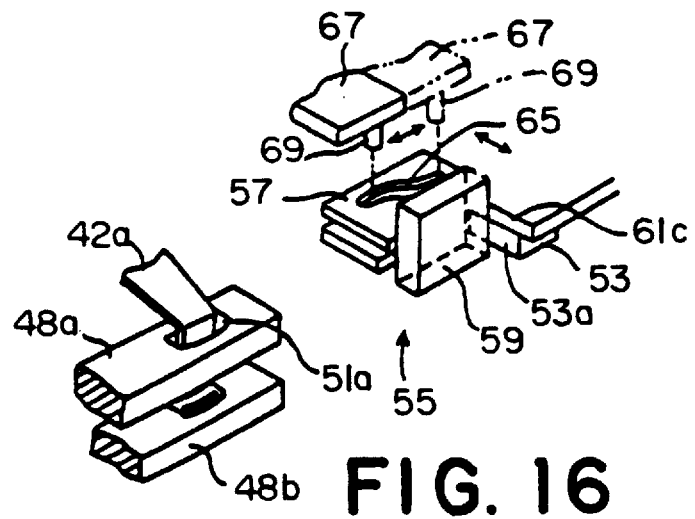
FIG. 16 is a perspective view showing details of the transmission arm in relation to the moving part and the pair of the push rods in accordance with a fifth embodiment of the present invention.

FIGS. 15 and 16 show that a first contact switch 53 is located on the bottom surface of a support plate 16c. When either of the push rods 48a, 48b is pushed in, the switch 53 is closed via a moving part 55.

Figure 17:
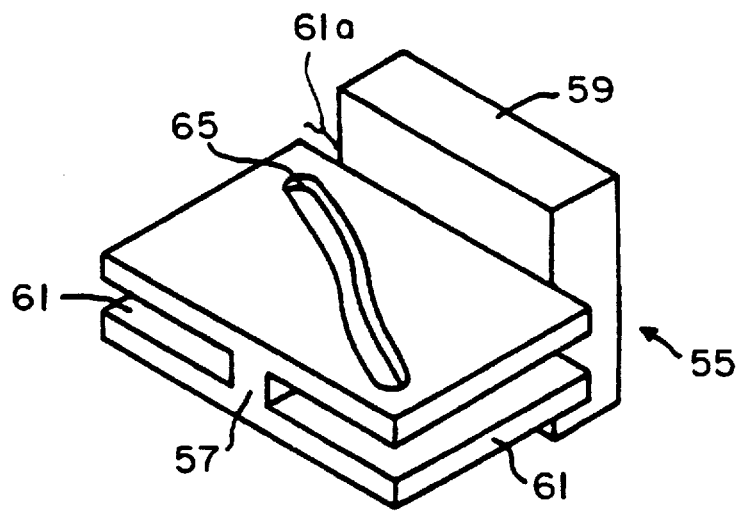
FIG. 17 is an enlarged perspective view of the moving part in accordance with a fifth embodiment of the present invention.

FIG. 17 shows the moving part 55 comprises a H-shaped part 57 disposed on the X_ side of a short part 59, located adjacent to the H-shaped part 57 on the X_+ side. In a preferred embodiment, the H-shaped part 57 and the short part 59 are molded as a single plastic piece. Since both ends of the H-shaped part 57 have a groove along the X_+_ directions and accept an edge of the support plate 16c, the moving part 55 slides along the X_+_ directions. Another groove 65 is formed on a top surface of the H-shaped part 57 along the Y_+_ directions as well as the X_+_ directions. A protrusion 69 of a transmission arm 67 engages the groove 65 as shown in FIG. 16. As the protrusion 69 moves in the groove 65 in the Y_+ direction, the moving part 55 moves in the X_ direction. Conversely, as the protrusion 69 moves in the groove 65 in the Y_ direction, the moving part 55 moves in the X_+ direction.

The first contact switch 53 is located on a bottom surface of a support plate 16c, and an edge 61 on the Y_+ side practically touches the first contact switch 53. When a knob 53a of the first contact switch 53 abuts an edge of the short part 59 on the Y_+ side and the moving part 55 moves, the short part 59 contacts the first contact switch 53 on the Y_+ side. However, an idle space 61a between the edge of the H-shaped part 61 to the short part 59 absorbs an initial movement of the moving part 55. In order to close the first contact switch 53 by pushing the knob 53a, more than the initial contact of the moving part 55 is necessary.

When the moving part 55 moves towards the X_+ direction, one surface of the short part 59 faces the knob 53a of the first contact switch 53 as shown in FIG. 13. Accordingly, the short part 59 of the moving part 55 is positioned within an operating area of ends of the push rods, 48a, 48b. When either of the push rods 48a, 48b is pushed in, the end of the push rod abuts the short part 59, which prevents the push rod from further advancement. That is, the push rods 48a, 48b are prevented from moving the swing levers 42a, 42b to eject a memory-card. As shown in FIG. 14, during the above described operation, the push rods 48a, 48b move over the distance of Δ1 in the $Y_+$ direction. This Δ1 movement has a sufficient force and distance to causes the short part 59 to activate the first contact switch 53. In this context where the short part 59 blocks the push rods 48a, 48b, an information process apparatus can interpret the activation of the first contact switch 53 as an operator's accidental push of the push rods 48a, 48b.

On the other hand, when the moving part 55 moves towards the $X_-$ direction, one surface of the short part 59 does not face the knob 53a of the first contact switch 53. Accordingly, the short part 59 of the moving part 55 is positioned outside an operating area of ends of the push rods, 48a, 48b. Under this condition, when either push rod 48a or 48b is pushed in, a corresponding end of the pushed rod 48a or 48b advances in the $Y_+$ direction without an interference of the short part 59. Since the push rods 48a, 48b respectively move the swing levers 42a, 42b, a memory card is ejected.

FIG. 15 shows that a second contact switch 66 is disposed on a bottom surface of a support plate 16c while a solenoid 84 is placed on a top surface of the support plate 16c. A transmission arm 67 is connected to the solenoid 84 via a drive shaft 86a at one end. Thus, in the fifth embodiment, only one solenoid is shared between the upper and lower storage spaces 24a and 24b.

Figure 18:
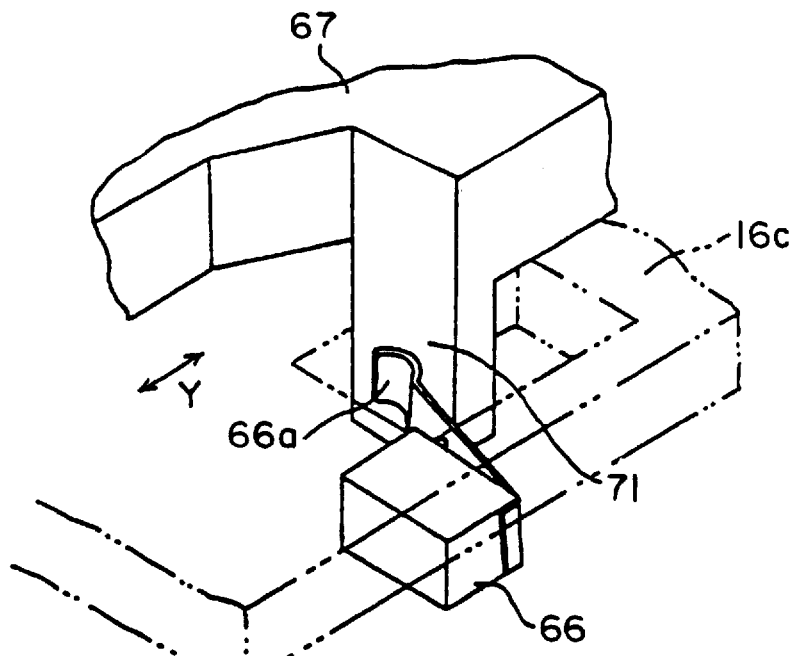
FIG. 18 is an enlarged perspective view of the second contact switch in relation to the transmission arm in accordance with a fifth embodiment of the present invention.

FIG. 18 shows an enlarged view of the second contact switch 66. When a memory card is inserted, an information processing apparatus detects a completion of the insertion and sends a corresponding signal according to a predetermined software program. Upon receiving this signal, the solenoid 84 forwards the drive shaft 86a so as to push the transmission arm 67 in the $Y_-$ direction. As the transmission arm 67 moves, a shoulder area 71 contacts a contact area 66a and activates the second contact switch 66, which in turn causes the information processing apparatus to invoke the disable mode for ejecting a memory-card. In the disable mode, the push rods 48a, 48b are inoperative to move the swing levers 42a, 42b and a cam 73 has advanced its projections 73b as will be fully described later. Although not shown in a figure, the disable mode is reversed by an operator's input command via a key board. Upon the command, the solenoid 84 retracts the drive shaft 86a, causing the second contact switch 66 to be deactivated, and the projection 73 is withdrawn. As a result, the push rods 48a, 48b are again enabled for ejecting a memory-card.

Figure 19:
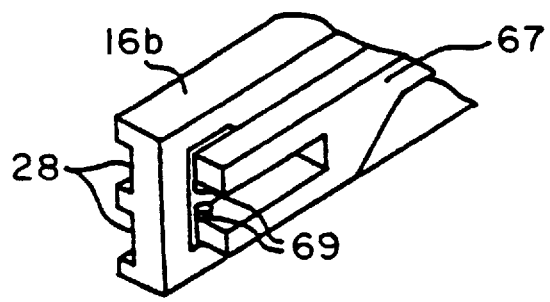
FIG. 19 is an enlarged perspective view of bifurcating ends of the transmission arm in accordance with a fifth embodiment of the present invention.

FIG. 19 shows an end of the transmission arm 67, which is connected to the solenoid 84 via the drive shaft 86a for movement in the Y direction. The transmission arm 67 drives both the second contact switch 66 and the projection 73. The end of the transmission arm 67 is forked and has a pair of protrusions 69 for guiding the moving part 55.

Figure 20:
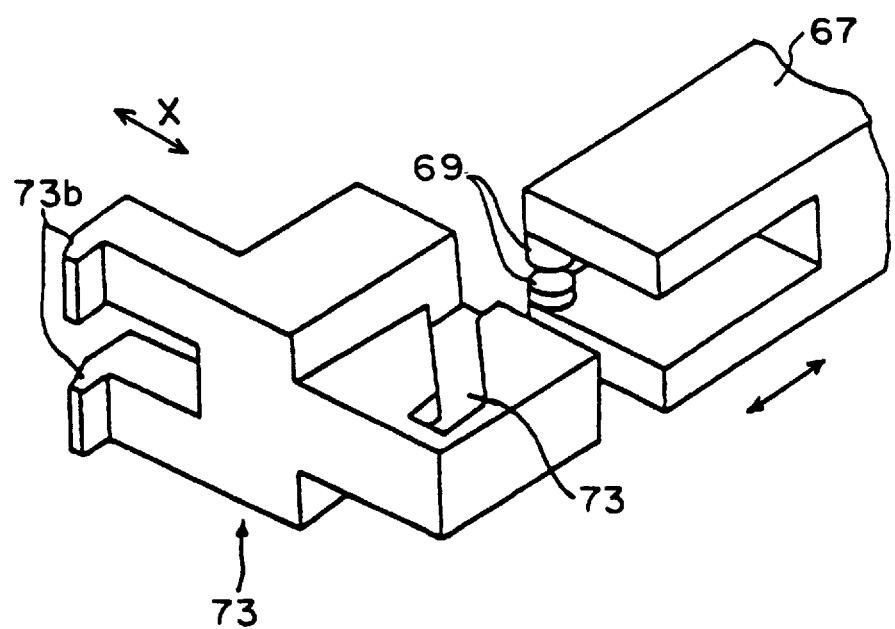
FIG. 20 is an enlarged perspective view of the bifurcating transmission arm and a cam/projection accordance with a fifth embodiment of the present invention.

FIG. 20 shows a cam 73 which prevents an inserted memory-card from being ejected and comprises a pair of card retaining projections 73b and a pair of grooves 73a. Although FIG. 20 does not show, the cam 73 is located in a recess similar to the recess 92a which accepts the projection 94a in the first embodiment, the recess formed in the side wall 16b communicating with the channel 92a and has an opening 95a leading to the insertion inlet of the connector apparatus. The operation of the cam 73 is substantially identical to that of the cam 94a of the first embodiment. The difference between the first and fifth embodiments, however, includes that a pair of projections 73b in the fifth embodiment is branched from the common cam 73 and that the common cam 73 in the fifth embodiment has a groove on a top surface as well as a bottom surface to guide a pair of the protrusions 69 on the transmission arm 67. This structure in the fifth embodiment allows simultaneous disablement or enablement of both upper and lower storage spaces 24a and 24b.

Upon detection of an inserted memory card in the upper and lower storage spaces 24a and 24b, an information processing apparatus activates the solenoid 84 according to predetermined software to move a transmission arm 67 in the $Y_-$ direction. As a result, the moving part 55 disables the push rods 48a, 48b. The transmission arm movement via the cam 73 and the grooves 73a also causes the projections 73b to extend into the insertion inlet and prevents the memory card 30 from being ejected. Lastly, the same transmission arm movement activates the second contact switch 66, which sends a signal indicating the disable mode to the information processing apparatus. In the disable mode, to eject the inserted memory-card, an operator can input a command via a key board to the information processing apparatus to overcome the blocked ejection. In response to the command, predetermined software in the information processing apparatus activates the solenoid 84, which moves the transmission arm in the $Y_+$ direction to cause the moving part 55 and the projection 73 to move in the $X_-$ direction for the enable mode. The same transmission arm movement deactivates the second contact switch 66, which send another signal indicating the enable mode to the information processing apparatus.

Although the use of two memory-cards is shown in conjunction with the fifth embodiment, only one memory-card can be used for this embodiment provided that appropriate changes are made to the software.

The fifth embodiment realizes a cost reduction and its simplified manufacturing process due to a fewer number of contact switches and solenoids in the fifth embodiment than in the first embodiment. In addition, since the enablement or disablement operations are handled by the same mechanism for the two memory-cards, it is easy for a user to operate the fifth embodiment.

Figure 21:
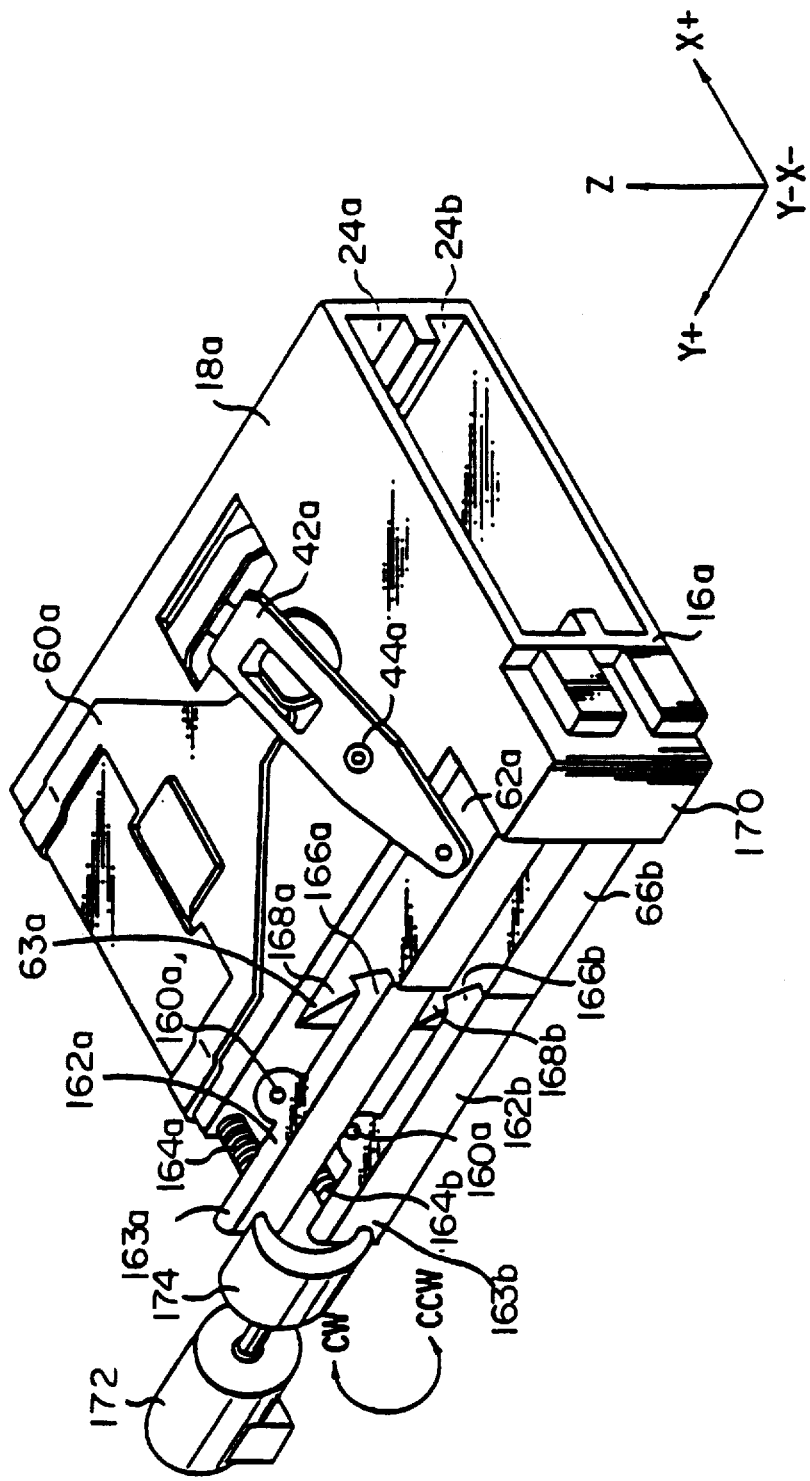
FIG. 21 is a perspective view showing a connector apparatus in accordance with a sixth embodiment of the present invention.

FIG. 21 shows a connector apparatus in accordance with a sixth embodiment of the present invention. In FIG. 21, the same reference numerals are employed to designate parts or elements corresponding to those shown in the first embodiment, unless expressly stated otherwise. For convenience of illustration only, the header 14 has been omitted from the drawing in FIG. 21.

The sixth embodiment is different from the first embodiment in that in place of the solenoid driven push rod decoupling mechanism, a motorized latch mechanism is provided for latching and unlatching the push rod 48a to prevent operation of the push rod 48a at appropriate times. Unlike the first embodiment, the connector apparatus of the sixth embodiment does not require a support plate (e.g. support plate 16c of FIGS. 1 and 4).

Referring to FIG. 21, the connector apparatus of the sixth embodiment comprises upper and lower push rod latching mechanisms that correspond to the upper and lower storage spaces 24a, 24b, respectively. The upper and lower latching mechanisms are of substantially the same configuration. In FIG. 21, a subscript "a" is attached to reference numerals representing the constituent elements of the upper latching mechanism, and a subscript "b" is attached to reference numerals representing the constituent elements of the lower latching mechanism. Element numerals that have no subscripts represent elements that are common to both the upper and lower latching mechanisms. For simplicity, only the upper latching mechanism will be explained hereinafter; it being understood that the lower latching mechanism operates is substantially identical to the upper latching mechanism.

As shown, the upper latching mechanism comprises a swing arm 162a that is rotatably coupled to the side wall 16a about a shaft 160a. A first end 163a of the swing arm 162a is biased in the X_ direction by a spring 164a that is fixed to the side wall 16a. An engaging claw 166a is formed on the opposite end of the swing arm 162a.

An upper push rod 62a is disposed in a guide 170 and is operable to slide back and forth in the $Y_{-/+}$ direction. As in the previous embodiments, the push rod 62a is coupled to one end of a swing lever 42a rotatably mounted on the connector apparatus. However, in this embodiment, the end of the swing lever 42a is more permanently coupled to the push rod 62a. Moreover, unlike the first embodiment, the swing lever 42a of the present embodiment does not have an elongated hole 76a and therefore cannot move in the X direction. The other end of the swing lever 42a is coupled to a slide plate 60a. As in the previous embodiments, movement of the push rod in one direction (i.e., $Y_+$ or $Y_-$) is transmitted through the swing lever 42a into movement of the slide plate 60a in the opposite direction.

A cutout 168a is formed in the far end 63a of the upper push rod 62a. The cutout 168a is positioned such that it engages with the claw 166a of the swing arm 162a. When the claw 166a of the swing arm 162a is engaged with the cutout 168a, the push rod 62a cannot move in the Y direction. Thus, the push rod 62a is "latched" in place, and the ejection mechanism is therefore disabled.

An electric motor 172 is disposed near the rear end of the connector apparatus. A substantially semi-cylindrical member 174 is mounted on the drive shaft of the motor 172, and is positioned proximate the ends 163a, 163b of the upper and lower swing arms 162a, 162b, respectively. The drive shaft of the motor can be driven in both clockwise CW and counter-clockwise CCW directions.

When the semi-cylindrical member 174 is rotated in the clockwise CW direction, the upper side end face of the semi-cylindrical member 174 pushes against the first end 163a of the upper swing arm 162a causing the swing arm to rotate about its rotation shaft 160a. As a result, the opposite end of the swing arm 162a moves away from the side wall 16b of the connector apparatus, and the claw 166a disengages from the cutout 168a of the push rod 62a. At this point, the push rod is "unlatched" and is free to move in the Y direction. Similarly, the lower push rod 62b can be unlatched by rotating the semi-cylindrical member 174 in the opposite direction. Like the solenoids 84a, 84b of the previous embodiments, the motor 172 can be driven by suitable control signals provided by a control circuit (not shown) or some other source in accordance with a program executed by the data processing device (e.g., computer) to which the connector apparatus is attached. As can be appreciated, this embodiment eliminates the need to decouple the push rod from the swing lever.

As the foregoing illustrates, the present invention is directed to a connector apparatus that includes means for decoupling a push rod from its associated ejection mechanism in order to disable the ejection mechanism.

Additionally, means for locking a memory card in the connector apparatus may be provided to prevent manual removal of the card. In another embodiment of the present invention, the connector apparatus may include means for selectively latching the push rod in place to prevent operation of the ejection mechanism. It is understood that changes may be made to the embodiments described above without departing from the broad inventive concepts thereof. For example, although only two storage spaces are present in the embodiments described above, more storage spaces can be added by increasing the height of the frame 12. Alternatively, a connector apparatus in accordance with present apparatus can be constructed with only one storage space, if desired. Moreover, although the exemplary card-like data processing medium of FIG. 3 is described herein as a "memory card", it is understood that the present invention is not limited to card-like data processing mediums that perform memory functions. Rather, any type of card-like data processing medium can be employed, such as, for example, a thin-type hard disc drive or an I/O function card. Accordingly, this invention is not limited to the particular embodiments disclosed, but is intended to cover all modifications that are within the scope and spirit of the invention as defined by the appended claims.

What is claimed is:

1. A connector apparatus for a card-like data processing medium, said connector apparatus comprising:

a frame having opposing side walls spaced at an interval substantially equal to the width of said card-like data processing medium, said opposing side walls defining a storage space, one end of said frame defining an insertion inlet for inserting the card-like data processing medium into the storage space;

a header coupled to the end of the frame opposite the insertion inlet, said header containing a terminal array for electrically connecting with a mating terminal array disposed in a forward end face of the card-like data processing medium;

an ejection mechanism for ejecting the card-like data processing medium from the storage space of said connector apparatus, said ejection mechanism having a push rod coupled thereto for manually operating said ejection mechanism; and means responsive to a control signal for automatically decoupling said push rod from said ejection mechanism thereby disabling the ejection mechanism.

2. The connector apparatus according to claim 1, wherein the ejection mechanism further comprises:

a slide plate movably mounted on the frame and operable to slide toward and away from the header, the slide plate having ejection hooks adapted to engage with the forward end face of the card-like data processing medium when it is inserted in the storage space; and a swing lever rotatably mounted on said connector apparatus and arranged to rotate in a plane parallel to the plane of said slide plate, one end of the pivot lever being coupled to the slide plate and the other end of the pivot lever being detachably coupled to said push rod, said push rod decoupling means being operative to decouple the push rod from the end of the swing lever, thereby disabling the ejection mechanism.

3. The connector apparatus of claim 1 further comprising:

a card locking member movably mounted on at least one of said side walls proximate the insertion inlet, said card locking member being responsive to a force applied thereto to move at least partially into said insertion inlet, thereby preventing the card-like data processing medium from being withdrawn from the storage space of the connector apparatus; and drive means responsive to a control signal for automatically and selectively applying said force to said card locking member.

4. The connector apparatus of claim 3 wherein said drive means comprises:

a solenoid having a drive shaft adapted to move lengthwise of said one side wall; and at least one transmission arm coupled between the drive shaft and the card locking member for transmitting movement of the drive shaft into movement of the card locking member.

5. The connector apparatus of claim 4 wherein the card locking member comprises a cam disposed in a recess formed in said one side wall, said cam having a projection that extends into the insertion inlet when the cam is moved toward the insertion inlet in response to movement of said at least one transmission arm.

6. The connector apparatus of claim 4 wherein the card locking member comprises a pivot arm rotatably mounted in a recess formed in said one side wall, one end of said pivot arm having a projection that rotates at least partially into said insertion inlet in response to a force applied to the pivot arm by said at least one transmission arm.

7. The connector apparatus of claim 4, wherein the card locking member comprises a locking arm, and wherein said at least one transmission arm comprises a plurality of coupling arms coupled between the drive shaft and one end of the locking arm, said coupling arms being adapted to transmit movement of the drive shaft into movement of the locking arm, said locking arm having a projection that moves at least partially into the insertion inlet in response to movement of the drive shaft.

8. The connector apparatus of claim 1 wherein the card-like data processing medium contains an integrated circuit.

9. The connector apparatus of claim 1 wherein the card-like data processing medium comprises a hard disc drive.

10. A connector apparatus for a card-like data processing medium, said connector apparatus comprising:

a frame having opposing side walls spaced at an interval substantially equal to the width of said card-like data processing medium, said opposing side walls defining a storage space, one end of said frame defining an insertion inlet for inserting the card-like data processing medium into the storage space;

a header coupled to the end of the frame opposite the insertion inlet, said header containing a terminal array for electrically connecting with a mating terminal array disposed in a forward end face of the card-like data processing medium;

a card locking member movably mounted on at least one of said side walls proximate the insertion inlet, said card locking member being responsive to a force applied thereto to move at least partially into said insertion inlet, thereby preventing the card-like data processing medium from being withdrawn from the storage space of the connector apparatus; and drive means coupled to the card locking member and responsive to a control signal for automatically and selectively applying said force to said card locking member.

11. The connector apparatus of claim 10 wherein said drive means comprises:

a solenoid having a drive shaft adapted to move lengthwise of said one side wall; and at least one transmission arm coupled between the drive shaft and the card locking member for transmitting movement of the drive shaft into movement of the card locking member.

12. The connector apparatus of claim 11 wherein the card locking member comprises a cam disposed in a recess formed in said one side wall, said cam having a projection that extends into the insertion inlet when the cam is moved toward the insertion inlet in response to movement of said at least one transmission arm.

13. The connector apparatus of claim 11 wherein the card locking member comprises a pivot arm rotatably mounted in a recess formed in said one side wall, one end of said pivot arm having a projection that rotates at least partially into said insertion inlet in response to a force applied to the pivot arm by said at least one transmission arm.

14. The connector apparatus of claim 11, wherein the card locking member comprises a locking arm, and wherein said at least one transmission arm comprises a plurality of coupling arms coupled between the drive shaft and one end of the locking arm, said coupling arms being adapted to transmit movement of the drive shaft into movement of the locking arm, said locking arm having a projection that moves at least partially into the insertion inlet in response to movement of the drive shaft.

15. The connector apparatus of claim 10 wherein the card-like data processing medium contains an integrated circuit.

16. The connector apparatus of claim 10 wherein the card-like data processing medium comprises a hard disc drive.

17. A connector apparatus for a card-like data processing medium, said connector apparatus comprising:

a frame having opposing side members spaced at an interval substantially equal to the width of said card-like data processing medium for guiding the card-like data processing member into said connector apparatus;

a header coupled to said frame and containing a terminal array for electrically connecting with a mating terminal array disposed in a forward end face of the cardlike data processing medium;

an ejection mechanism for ejecting the card-like data processing medium from said connector apparatus, said ejection mechanism having a push rod mounted on said connector apparatus for manually operating said ejection mechanism; and means responsive to a control signal for selectively preventing movement of the push rod to disable the ejection mechanism.

18. The connector apparatus of claim 17 wherein the card-like data processing medium contains an integrated circuit.

19. The connector apparatus of claim 17 wherein the card-like data processing medium comprises a hard disc drive.

20. The connector apparatus of claim 17 wherein said means for preventing movement of the push rod comprises:

a moving part mounted on said connector apparatus and adapted to move into an operating area of the push rod to block movement of the pushrod;

a solenoid having a drive shaft and being responsive to said control signal to move said drive shaft; and a transmission arm coupled between said moving part and the drive shaft of said solenoid, said transmission arm transmitting movement of said drive shaft into movement of said moving part into and out of the operating area of the push rod.

21. The connector apparatus of claim 17 wherein said means for preventing movement of the push rod comprises a swing arm rotatably mounted on said connector apparatus and having a first end and a second end, the second end of said swing arm being operable to rotate into and out of engagement with an end of said push rod.

22. The connector apparatus of claim 21 wherein the second end of said swing arm is normally biased into engagement with said push rod, and wherein the means for preventing movement of the push rod further comprises means responsive to a control signal for selectively applying a force to the first end of said swing arm to rotate the second end of said swing arm out of engagement with the push rod, thereby releasing the push rod and enabling operation of the ejection mechanism.

23. The connector apparatus of claim 21 wherein the second end of said swing arm has a claw that engages with a cutout on said push rod, thereby latching the push rod and preventing movement thereof.

* * * * *